US012587662B2

(12) United States Patent
Lee et al.

(10) Patent No.: US 12,587,662 B2
(45) Date of Patent: Mar. 24, 2026

(54) METHOD, APPARATUS AND STORAGE MEDIUM FOR IMAGE ENCODING/DECODING

(71) Applicants: Electronics and Telecommunications Research Institute, Daejeon (KR); Korea Advanced Institute of Science and Technology, Daejeon (KR)

(72) Inventors: Jooyoung Lee, Daejeon (KR); Mun-Churl Kim, Daejeon (KR); Jong-Min Park, Daejeon (KR)

(73) Assignees: Electronics and Telecommunications Research Institute, Daejeon (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/731,101

(22) Filed: May 31, 2024

(65) Prior Publication Data

US 2024/0406422 A1      Dec. 5, 2024

(30) Foreign Application Priority Data

May 31, 2023    (KR) ......................... 10-2023-0070191
May 31, 2024    (KR) ......................... 10-2024-0071361

(51) Int. Cl.
| | |
|---|---|
| *H04N 19/33* | (2014.01) |
| *H04N 19/147* | (2014.01) |
| *H04N 19/42* | (2014.01) |
| *H04N 19/50* | (2014.01) |

(52) U.S. Cl.
CPC ........... *H04N 19/33* (2014.11); *H04N 19/147* (2014.11); *H04N 19/42* (2014.11); *H04N 19/50* (2014.11)

(58) Field of Classification Search
CPC ...... H04N 19/33; H04N 19/147; H04N 19/42; H04N 19/50
See application file for complete search history.

(56) References Cited

U.S. PATENT DOCUMENTS

| | | | |
|---|---|---|---|
| 11,412,225 B2 | 8/2022 | Lee et al. | |
| 2016/0165243 A1* | 6/2016 | Nakagami ............. | H04N 19/59 |
| | | | 375/240.08 |
| 2021/0256657 A1* | 8/2021 | Meng ..................... | G06N 3/045 |
| 2021/0342973 A1 | 11/2021 | Jung et al. | |
| 2023/0083476 A1 | 3/2023 | Moon et al. | |
| 2025/0069369 A1* | 2/2025 | Rosewarne .......... | G06N 3/0464 |

FOREIGN PATENT DOCUMENTS

| | | |
|---|---|---|
| KR | 10-2021-0133457 A | 11/2021 |
| WO | 2011/027256 A1 | 3/2011 |

* cited by examiner

*Primary Examiner* — Nasim N Nirjhar

(74) *Attorney, Agent, or Firm* — BROADVIEW IP LAW, PC

(57) ABSTRACT

Disclosed herein are a method, an apparatus and a storage medium for image encoding/decoding. There is proposed a novel NN-based spatially scalable image compression method, called Compression with Arbitrary-scale Spatial Scalability (COMPASS), which supports arbitrary-scale spatial scalability. COMPASS may have a very flexible structure in which the number of multiple layers and respective scale factors of the multiple layers can be arbitrarily determined during inference. In order to reduce the spatial redundancy between adjacent layers for arbitrary scale factors, COMPASS may adopt an inter-layer arbitrary scale prediction method, called a Local Implicit Filter Function (LIFF) based on implicit neural representation.

16 Claims, 6 Drawing Sheets

(a) $\hat{I}^{k-1}$      (b) $\hat{I}^{k}$      (c) $I^{k}$      (d) $I_{res}^{k}$

METHOD, APPARATUS AND STORAGE MEDIUM FOR IMAGE ENCODING/DECODING

CROSS REFERENCE TO RELATED APPLICATIONS

This application claims the benefit of Korean Patent Application Nos. 10-2023-0070191, filed May 31, 2023, and 10-2024-0071361, filed May 31, 2024, which are hereby incorporated by reference in their entireties into this application.

BACKGROUND OF THE INVENTION

1. Technical Field

The present disclosure relates generally to a method, an apparatus and a storage medium for image encoding/decoding. More particularly, the present disclosure relates to a method, an apparatus, and a storage medium for scalable image compression.

2. Description of the Related Art

With the growth of multimedia applications, image compression becomes increasingly important. The outstanding performance of neural network-based methods in computer vision has led to active research into Neural Network (NN)-based image compression methods, thus resulting in remarkable improvement in coding efficiency.

However, although the same content is often consumed in various versions in multimedia systems, most existing NN-based image compression methods need to separately compress an image into multiple bitstreams for respective versions, thus leading to low coding efficiency.

In order to resolve this issue, a few embodiments related to NN-based scalable image compression can be used, wherein various versions of an image may be encoded into a single bitstream in a hierarchical manner with multiple layers.

Each layer may function to encode/decode one corresponding version of the image, and typically, redundancy between adjacent layers may be reduced by a prediction method for higher coding efficiency.

In conventional tool-based scalable coding, Scalable Video Coding (SVC) and Scalable High Efficiency Video Coding (SHVC) have been standardized by Moving Picture Experts Group (MPEG) for video coding standards, as extensions to H.264/Advanced Video Coding (AVC) and H.265/HEVC, respectively.

SUMMARY OF THE INVENTION

An embodiment is intended to provide an apparatus, a method and a storage medium for images, which support arbitrary-scale spatial scalability.

In accordance with an aspect, there is provided an image coding method, including generating a bitstream including information about multiple scaled versions of an image; and storing the bitstream.

Each version of the image in the bitstream may be encoded with a layer corresponding to the version.

The bitstream may be generated by a neural network-based image compression network that supports arbitrary-scale spatial scalability.

In the neural network-based image compression network, a number of multiple layers and respective scale factors of the multiple layers may be arbitrarily determined during inference.

The scale factors may include values other than 2.

The multiple layers may include a base layer and one or more enhancement layers.

In the base layer, an input image having a smallest size may be input to an image compression module, and a reconstructed image may be generated using the input image.

A single shared prediction module may be used for the one or more enhancement layers.

A combined rate-distortion loss function may be used for the one or more enhancement layers.

A shared sub-network may be used for each of the one or more enhancement layers.

The sub-network may include an inter-layer arbitrary scale prediction module and a residual compression module.

The neural network-based image compression network may use an inter-layer arbitrary scale prediction method based on implicit neural representation.

There may be provided a computer-readable storage medium for storing the bitstream generated by the image coding method.

In another aspect, there is provided an image coding method, including obtaining a bitstream; and performing decoding on an image using information about multiple scaled versions of the image in the bitstream.

Each version of the image in the bitstream may be encoded with a layer corresponding to the version.

The bitstream may be processed by a neural network-based image compression network that supports arbitrary-scale spatial scalability.

In the neural network-based image compression network, a number of multiple layers and respective scale factors of the multiple layers may be arbitrarily determined during inference.

The scale factors may include values other than 2.

The multiple layers may include a base layer and one or more enhancement layers.

A single shared prediction module may be used for the one or more enhancement layers.

In a further aspect, there is provided a method for transmitting a bitstream generated by an image encoding apparatus, the method including transmitting the bitstream, wherein the bitstream includes information about multiple scaled versions of an image.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
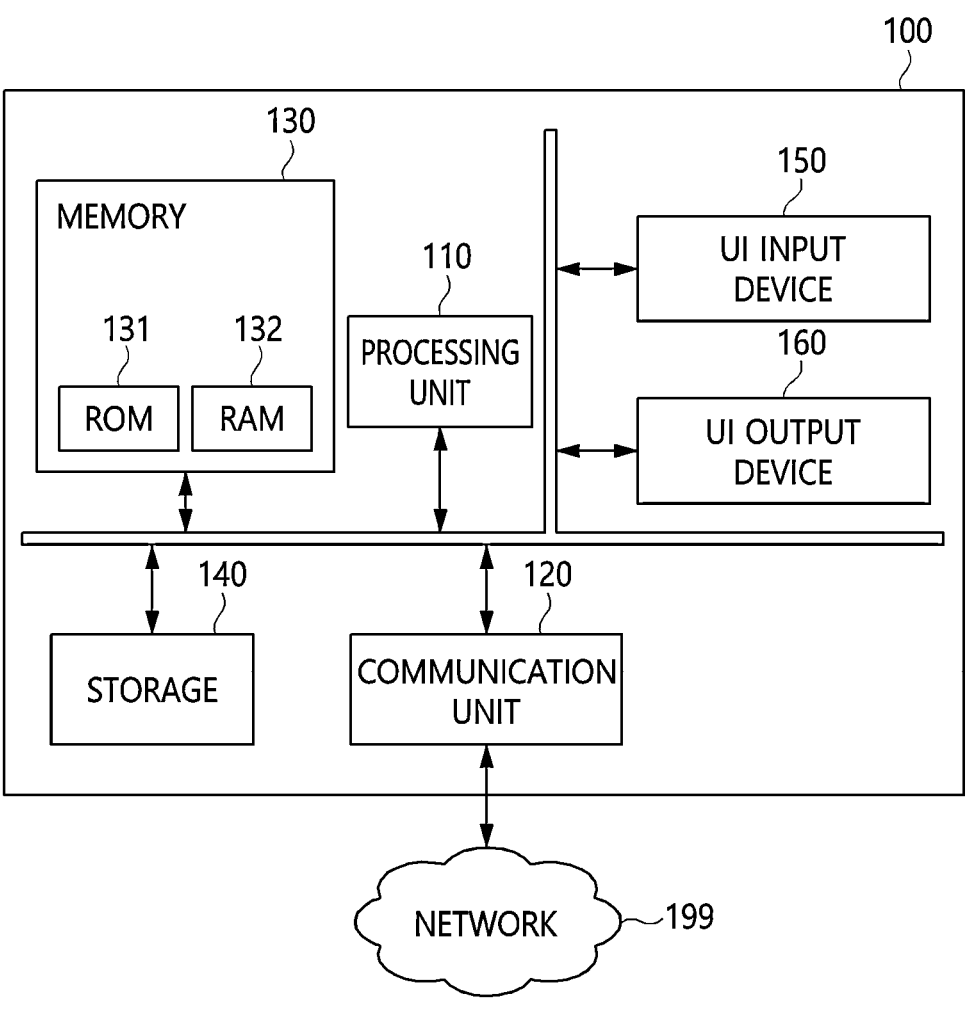
FIG. 1 is a configuration diagram of an encoding apparatus according to an embodiment.

The present disclosure may be variously modified and may have various embodiments, wherein specific embodiments are intended to be illustrated in the accompanying drawings and described in the detailed description of the disclosure. However, this is not intended to limit the present disclosure to particular modes of practice, and it should be understood that all changes, equivalents, and substitutes that do not depart from the spirit and technical scope of the present disclosure are encompassed in the present disclosure.

Detailed descriptions of example embodiments to be described later refer to the accompanying drawings illustrating a specific embodiment as an example. These embodiments are described so that those skilled in the art to which the present disclosure pertains can easily practice the embodiments. It should be understood that the various embodiments are different from each other, but are not necessarily mutually exclusive from each other. For example, specific shapes, structures, and characteristics described here may be implemented in other embodiments without departing from the spirit and scope of the present disclosure in relation to one embodiment. In addition, it should be understood that the location or arrangement of individual components within each disclosed embodiment may be changed without departing from the spirit and scope of the embodiments. Therefore, the detailed description which will be made later is not intended to be taken in a limited sense, and the scope of the example embodiments, if appropriate, is limited only by the accompanying claims, along with the entire scope equivalent to those of the accompanying claims.

It should be noted that similar reference numerals in the drawings are used to designate the same or similar functions throughout various aspects. The shapes, sizes, etc. of components in the drawings may be exaggerated to make the description clearer.

In the present disclosure, it will be understood that, although the terms "first", "second", etc. may be used herein to describe various components, these components should not be limited by these terms. These terms are only used to distinguish one component from other components. For instance, a first component may be referred to as a second component without departing from the scope of the present disclosure, and similarly, a second component may also be referred to as a first component. The term "and/or" may include a combination of a plurality of related listed items or any of the plurality of related described items.

It should be understood that, in this specification, the case where one component is "connected" or "coupled" to an additional component may refer to not only the case where one component is directly connected or coupled to the additional component but also the case where one component is indirectly connected or coupled to the additional component through an intermediate component. In contrast, it should be understood that when a component is referred to as being "directly coupled" or "directly connected" to an additional component, there are no intervening components between the two components.

The components illustrated in the embodiments are depicted independently to represent different characteristic functions, which do not imply that each component is composed of separate hardware or a single software component. Each component is listed and included as each component for convenience of description, and at least two of the components may be combined to form one component, or one component may be divided into multiple components to perform functions. Also, the embodiment in which the components are combined and the embodiment in which each component is separated into multiple components are also included in the scope of the present disclosure as long as they do not depart from the essence of the present disclosure.

The terms used in embodiments are used only to describe a specific embodiment, and are not intended to limit the scope of the present disclosure. In the present disclosure, the singular forms are intended to include the plural forms as well, unless the context clearly indicates otherwise. In embodiments, it should be further understood that the terms "comprise", "include", and "have" when used in this specification, specify the presence of stated features, integers, steps, operations, elements, components, and/or combinations of them but do not preclude the presence or addition of one or more other features, integers, steps, operations, elements, components, and/or combinations thereof. That is, in embodiments, when it is said that a specific component is "included", it may mean that components other than the specific component are not excluded and that additional components may be included in the embodiments of the present disclosure or the scope of the technical spirit of the present disclosure.

In embodiments, the term "at least one" may denote one of numbers equal to or greater than 1, such as 1, 2, 3 and 4. In embodiments, the term "a plurality of" may denote one of numbers equal to or greater than 2, such as 2, 3 and 4.

Some components in the embodiments are not essential components that perform intrinsic functions in the present disclosure, but may merely be optional components intended to enhance performance. The embodiments may be implemented to include only the essential components necessary to realize the essence of the embodiments, excluding components used merely for performance enhancement. A structure including only the essential components, excluding optional components used merely for performance enhancement, is also included in the scope of the embodiments.

Hereinafter, embodiments of the present disclosure are described in detail with reference to the accompanying drawings so that those skilled in the art to which the present disclosure pertains can easily practice the present disclosure. In the description of the embodiments, detailed descriptions of known functions or configurations which are deemed to make the gist of the present disclosure obscure will be omitted. Further, the same reference numerals are used to designate the same or similar components throughout the drawings, and repeated descriptions of the same components will be omitted.

Hereinafter, an image may refer to one of pictures constituting video, and may also refer to video itself. For example, "image encoding and/or decoding" may refer to "video encoding and/or decoding", and may also refer to "encoding and/or decoding of one of images constituting the video".

Hereinafter, the terms "video" and "motion picture(s)" may be used to have the same meaning, and may be used interchangeably with each other.

Hereinafter, the terms "image", "picture", "frame", and "screen" may be used to have the same meaning, and may be used interchangeably with each other.

FIG. 1 is a configuration diagram of an encoding apparatus according to an embodiment.

An encoding apparatus 100 may include a processing unit 110, memory 130, a user interface (UI) input device 150, a UI output device 160, and storage 140, which communicate with each other through a bus 190. The encoding apparatus 100 may further include a communication unit 120 connected to a network 199.

The processing unit 110 may be a semiconductor device for executing processing instructions stored in a Central Processing Unit (CPU), the memory 130 or the storage 140. The processor unit 110 may be at least one hardware processor.

The processing unit 110 may generate and process signals, data or information which are input to the encoding apparatus 100, are output from the encoding apparatus 100, or are used in the encoding apparatus 100, and may perform tests (checks), comparison, determination, etc. related to the signals, data or information. In other words, in an embodiment, the generation and processing of data or information and the tests, comparison, and determination related to the data or information may be performed by the processing unit 110.

The processing unit 110 may generate a bitstream. The processing unit 110 may perform operations for generating the bitstream described in embodiments.

At least some of the units described in embodiments may be program modules, and may communicate with an external device or system. The program modules may be included in the encoding apparatus 100 in the form of an operating system, an application module, and other program modules.

The program modules may be physically stored in various known storage devices. Further, at least some of the program modules may be stored in a remote storage device capable of communicating with the encoding apparatus 100.

The program modules may include, but are not limited to, a routine, a subroutine, a program, an object, a component, a data structure, etc., which perform functions or operations according to an embodiment or implement an abstract data type according to an embodiment.

The program modules may be implemented using instructions or codes that are executed by at least one processor of the encoding apparatus 100.

The processing unit 110 may execute the instructions or codes of the units described in embodiments.

A storage unit may refer to the memory 130 and/or the storage 140. Each of the memory 130 and the storage 140 may be any of various types of volatile or nonvolatile storage media. For example, the memory 130 may include at least one of Read Only Memory (ROM) 131 and Random Access Memory (RAM) 132.

The storage unit may store data or information used for the operation of the encoding apparatus 100. In an embodiment, the data or information of the encoding apparatus 100 may be stored in the storage unit.

The encoding apparatus 100 may be implemented in a computer system including a computer-readable storage medium.

The storage medium may store at least one module required by the encoding apparatus 100 to perform operations. The memory 130 may store at least one module, and may be configured such that the at least one module is executed by the processing unit 110.

Functions related to the communication of data or information of the encoding apparatus 100 may be performed through the communication unit 120.

For example, the communication unit 120 may transmit the bitstream to a decoding apparatus 200, which will be described below.

Figure 2:
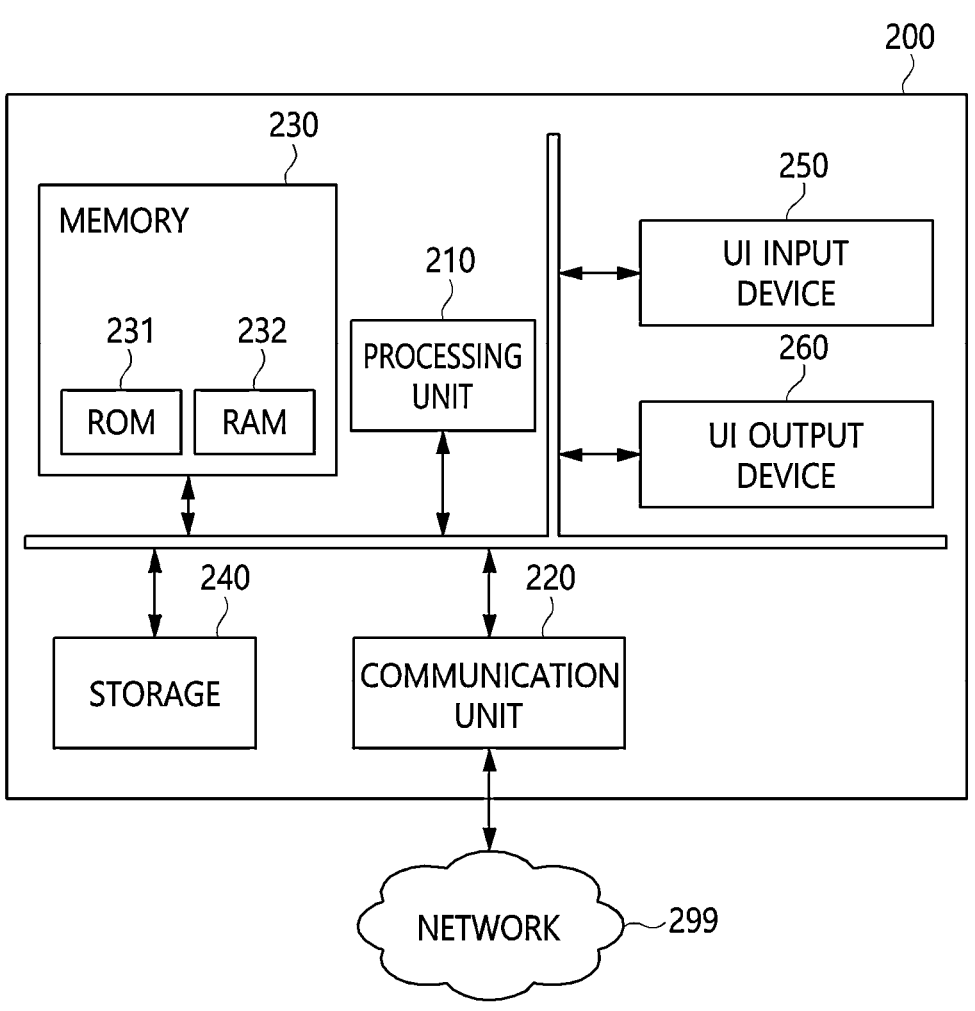
FIG. 2 is a configuration diagram of a decoding apparatus according to an embodiment.

FIG. 2 is a configuration diagram of a decoding apparatus according to an embodiment.

The decoding apparatus 200 may include a processing unit 210, memory 230, a user interface (UI) input device 250, a UI output device 260, and storage 240, which communicate with each other through a bus 290. The decoding apparatus 200 may further include a communication unit 220 connected to a network 299.

The processing unit 210 may be a semiconductor device for executing processing instructions stored in a Central Processing Unit (CPU), the memory 230 or the storage 240. The processor unit 210 may include at least one hardware processor.

The processing unit 210 may generate and process signals, data or information which are input to the decoding apparatus 200, are output from the decoding apparatus 200, or are used in the decoding apparatus 200, and may perform tests (checks), comparison, determination, etc. related to the signals, data or information. In other words, in an embodiment, the generation and processing of data or information and the tests, comparison, and determination related to the data or information may be performed by the processing unit 210. The processing unit 210 may use a bitstream. The processing unit 210 may perform operations that use the bitstream described in embodiments.

At least some of the units described in embodiments may be program modules, and may communicate with an external device or system. The program modules may be included in the decoding apparatus 200 in the form of an operating system, an application module, and other program modules.

The program modules may be physically stored in various known storage devices. Further, at least some of the program modules may be stored in a remote storage device capable of communicating with the decoding apparatus 200.

The program modules may include, but are not limited to, a routine, a subroutine, a program, an object, a component, a data structure, etc., which perform functions or operations according to an embodiment or implement an abstract data type according to an embodiment.

The program modules may be implemented using instructions or codes that are executed by at least one processor of the decoding apparatus 200.

The processing unit 210 may execute the instructions or codes of the units described in embodiments.

A storage unit may refer to the memory 230 and/or the storage 240. Each of the memory 230 and the storage 240 may be any of various types of volatile or nonvolatile storage media. For example, the memory 230 may include at least one of Read Only Memory (ROM) 231 and Random Access Memory (RAM) 232.

The storage unit may store data or information used for the operation of the decoding apparatus 200. In an embodiment, the data or information of the decoding apparatus 200 may be stored in the storage unit.

The decoding apparatus 200 may be implemented in a computer system including a computer-readable storage medium.

The storage medium may store at least one module required by the decoding apparatus 200 to perform operations. The memory 230 may store at least one module, and may be configured such that the at least one module is executed by the processing unit 210.

Functions related to the communication of data or information of the decoding apparatus 200 may be performed through the communication unit 220.

For example, the communication unit 220 may receive the bitstream from the encoding apparatus 100.

Recently, research into a Neural Network (NN)-based image compression has been actively conducted, and shows impressive performance compared to traditional schemes.

However, most research has focused on non-scalable image compression (single-layer coding) whereas spatially scalable image compression has attracted less attention although it has many applications.

In embodiments, there is proposed a novel NN-based spatially scalable image compression method, called Compression with Arbitrary-scale Spatial Scalability (COMPASS), which supports arbitrary-scale spatial scalability.

COMPASS, described in embodiments, may have a very flexible structure in which the number of multiple layers and respective scale factors of the multiple layers can be arbitrarily determined during inference.

In order to reduce the spatial redundancy between adjacent layers for arbitrary scale factors, COMPASS may adopt an inter-layer arbitrary scale prediction method, called a Local Implicit Filter Function (LIFF) based on implicit neural representation.

In embodiments, LIFF may refer to an inter-layer arbitrary scale prediction method based on implicit neural representation used in COMPASS.

In embodiments, a combined Rate-Distortion (RD) loss function may be used to effectively train multiple layers.

For example, COMPASS may achieve a BD-rate gain of −58.33% and −47.17% at maximum compared to Scalable extensions of High efficiency Video Coding (SHVC) standard and a state-of-the-art NN-based spatially scalable image compression method, respectively, for various combinations of scale factors.

COMPASS may exhibit comparable or even better coding efficiency compared to single-layer coding for various scale factors.

Despite of significant coding efficiency improvement compared to separate single-layer compression of different versions (i.e., simulcast coding), scalable coding has not yet been widely adopted for real-world applications.

One reason may be lower coding efficiency of accumulated bitstreams for a larger version compared to single-layer coding of the same size. Scalable coding may often exhibit lower coding efficiency due to insufficient redundancy removal capability between layers.

Further, for existing NN-based methods, only one fixed scale factor of 2 may be used between adjacent layers.

Such restriction may not be practical for real-world applications requiring the diversity of scale combinations.

For example, an image of 4,000×2,000 size needs to be encoded into SD (720×480), HD (1,280×720) and FHD (1,920×1,080) versions which are not in powers of 2 scales compared to the input size. Therefore, in order to support One-Source-Multiple-Use (OSMU) having spatially scalable image compression, it is worthwhile for spatially scalable image compression to support arbitrary scale factors between different layers.

In order to resolve the above-described issues, the following embodiments may be provided.

There can be provided a novel NN-based image compression network having arbitrary-scale spatial scalability, called COMPASS.

COMPASS in embodiments may provide spatially scalable image compression, which encodes multiple arbitrarily scaled versions of an image into a single bitstream.

In embodiments, the bitstream may include information about multiple scaled versions of the image. Each version of the image in the bitstream may be encoded with a layer corresponding to the version.

In embodiments, based on implicit neural representation which reduces redundancy between adjacent layers and supports arbitrary scale factors, an inter-layer arbitrary scale prediction method called a Local Implicit Filter Function (LIFF) may be used.

In embodiments, the arbitrary scale factor may refer to a scale factor that is not limited to powers of 2. Alternatively, the arbitrary scale factor may refer to a scale factor that is not limited to a fixed value of 2.

In embodiments, the arbitrary scale factor may refer to scale factors that are not powers of 2. Alternatively, the arbitrary scale factor may include values that are not powers of 2. Alternatively, the arbitrary scale factor may refer to another scale factor that is not a fixed scale factor of 2.

The arbitrary scale factors in embodiments may include values that are not powers of 2. Alternatively, the arbitrary scale factors may include values other than 2.

Furthermore, COMPASS may use only a single shared prediction/compression module for all enhancement layers, thus effectively providing extensibility in terms of the number of layers and reducing the number of model parameters.

For efficient and stable optimization of the hierarchically recursive architecture of COMPASS, a combined RD loss function may be used.

Based on superior inter-layer prediction capability, COMPASS may significantly improve coding efficiency compared to the existing scalable coding methods, and may provide comparable or even better coding efficiency compared to single-layer coding for various scale factors.

The coding efficiency of single-layer coding has been regarded as the upper bound of scalable coding efficiency. Furthermore, COMPASS may be a first NN-based spatially scalable image compression method that supports arbitrary scale factors with higher coding efficiency.

The characteristics of COMPASS described in embodiments are described below.

COMPASS may be the first NN-based spatially scalable image compression method for arbitrary scale factors.

COMPASS may provide inter-layer arbitrary scale prediction called LIFF, which effectively reduces redundancy and supports arbitrary scale factors. In addition, embodiments may provide a combined RD loss function to effectively train multiple layers.

COMPASS may exhibit much better performance than the existing spatially scalable coding methods. Furthermore, COMPASS may show comparable or even better performance in terms of coding efficiency compared to single-layer coding for various scale factors, based on the same image compression backbone.

Neural Network-Based Image Compression

Neural network-based image compression methods may be optimized in an end-to-end manner.

For example, a deep convolutional Neural Network (NN)-based image compression method may be used.

For example, entropy model-based approaches that jointly minimize rate and distortion terms in an optimization phase may be used. Subsequent models, such as hyperprior, autoregressive models, Gaussian mixture models, non-local attention modules, channel-wise auto-regressive entropy models, and checkerboard context models, may improve coding efficiency.

Several generative model-based methods related to human perception-oriented compression may also be used.

Several NN-based variable-rate compression models may be adopted to support multiple compression quality levels with a single trained model.

Despite the significant improvements in coding efficiency and functionality brought about by the NN-based image compression networks, issues with coding efficiency when encoding different versions of an image may still remain.

Spatially Scalable Image Compression

In OSMU applications that support display devices having various sizes, there may frequently occur the case where images need to be compressed and transmitted to target devices having appropriate spatial sizes.

In order to meet these requirements, scalable extensions such as SVC and SHVC may be used for coding standards such as H.264/AVC and H.265/HEVC, respectively.

NN-based approaches for scalable image compression may also be used.

However, most of these methods focus on quality scalability, and only some of the methods may relate to spatial scalability.

Such several methods may provide hierarchical architecture, which outperforms simulcast coding and SVC and shows comparable performance to SHVC in terms of coding efficiency.

However, these methods may provide only fixed integer scale factors with powers of 2.

Furthermore, these methods did not provide any experimental evidences for extended multiple enhancement layers more than 2 even though the methods had provided the concept of layer extension.

Arbitrary Scale Super-Resolution

With the development of neural networks, super-resolution may be provided using arbitrary scale factors.

For example, meta-SR (abbreviation for a magnification arbitrary network for super-resolution) that is a neural network-based method for super-resolution with arbitrary scales may be adopted. In the neural network-based method, a meta-upscale module may take relative coordinates and a scale factor as input so as to dynamically predict upscaling filters.

For example, an asymmetric super-resolution method using conditional convolution may be used.

For example, a continuous image representation method having a Local Implicit Image Function (LIIF) may be used, and this method may exhibit outstanding performance for large scale (×30) super-resolution which falls out of training distribution.

For example, a periodic encoding method having an implicit function may be used.

Such arbitrary scale super-resolution methods may be used for inter-layer arbitrary scale prediction in COMPASS according to embodiments.

These methods may be called LIFF, which may effectively reduce redundancy between adjacent layers using arbitrary scale factors.

Image Compression Method

Overall Architecture

Figure 3:
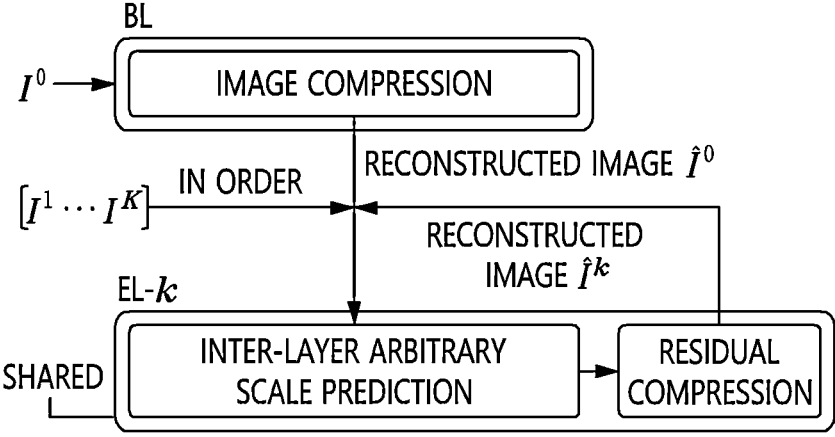
FIG. 3 illustrates the structure of COMPASS according to an example.

FIG. 3 illustrates the structure of COMPASS according to an example.

According to the description of FIG. 3, COMPASS may support spatially scalable coding of K+1 arbitrary scaled versions of an image using a Base Layer (BL) and one or more Enhancement Layers (EL).

In embodiments, arbitrary scaling may refer to scaling having scale factors that are not limited to powers of 2. Arbitrary scaling may refer to scaling using scale factors that are not powers of 2. Arbitrary scaling may refer to scaling having scale factors that are not limited to 2. Arbitrary scaling may refer to scaling using scale factors other than 2.

In embodiments, EL-k may denote a k-th enhancement layer.

Here, EL-k may use shared sub-networks which are inter-layer arbitrary scale prediction and residual compression modules.

Here, $1 \leq k \leq K$ may be satisfied.

In FIG. 3, $I_0$ may indicate an input image having a minimum size in the base layer (BL).

In FIG. 3, $I_1, \ldots I_K$ may be input images in increasing (ascending) order of scale factors in the enhancement layers (EL). Here, Ix may be an input image having the maximum size.

A scale factor between two adjacent layers may be any arbitrarily positive value.

FIG. 3 is a flow diagram of COMPASS.

In COMPASS, multiple layers may include a Base Layer (BL) and one or more Enhancement Layers (EL).

COMPASS may include two types of layers. The first type of the layers may be a base layer that encodes a lowest resolution image. The second type of the layers may be one or more enhancement layers that sequentially encode multiple higher resolution images of arbitrary scales.

For spatially scalable coding of (K+1)-scaled images $\{I^0, \ldots, I^K\}$ of gradually increasing sizes with arbitrary scale factors, COMPASS may be operated with multi-coding of BL and K ELs, where each of BL and K ELs may encode the correspondingly scaled input image.

COMPASS may exploit the shared modules for all of the ELs. Here, each EL may be recursively operated, as described above with reference to FIG. 3.

In the BL, the input image $I^0$ having the smallest size may be input to a CNN-based image compression module, and $\hat{I}^0$ may be reconstructed using the input image $I^0$.

In the EL-k, the corresponding input image $I^k$ and a reconstructed image $\hat{I}^{k-1}$ of a previous layer may be input to the current enhancement layer, and $\hat{I}^k$ may be reconstructed using both $I^k$ and $\hat{I}^{k-1}$.

In particular, in the EL-k, an inter-layer arbitrary scale prediction module may effectively estimate and reduce the spatial redundancy between $\hat{I}^{k-1}$ and $I^k$ for an arbitrary scale factor.

Therefore, a residual compression module may encode only resulting essential residues in reconstructing $\hat{I}^k$ with higher coding efficiency.

Figure 4:
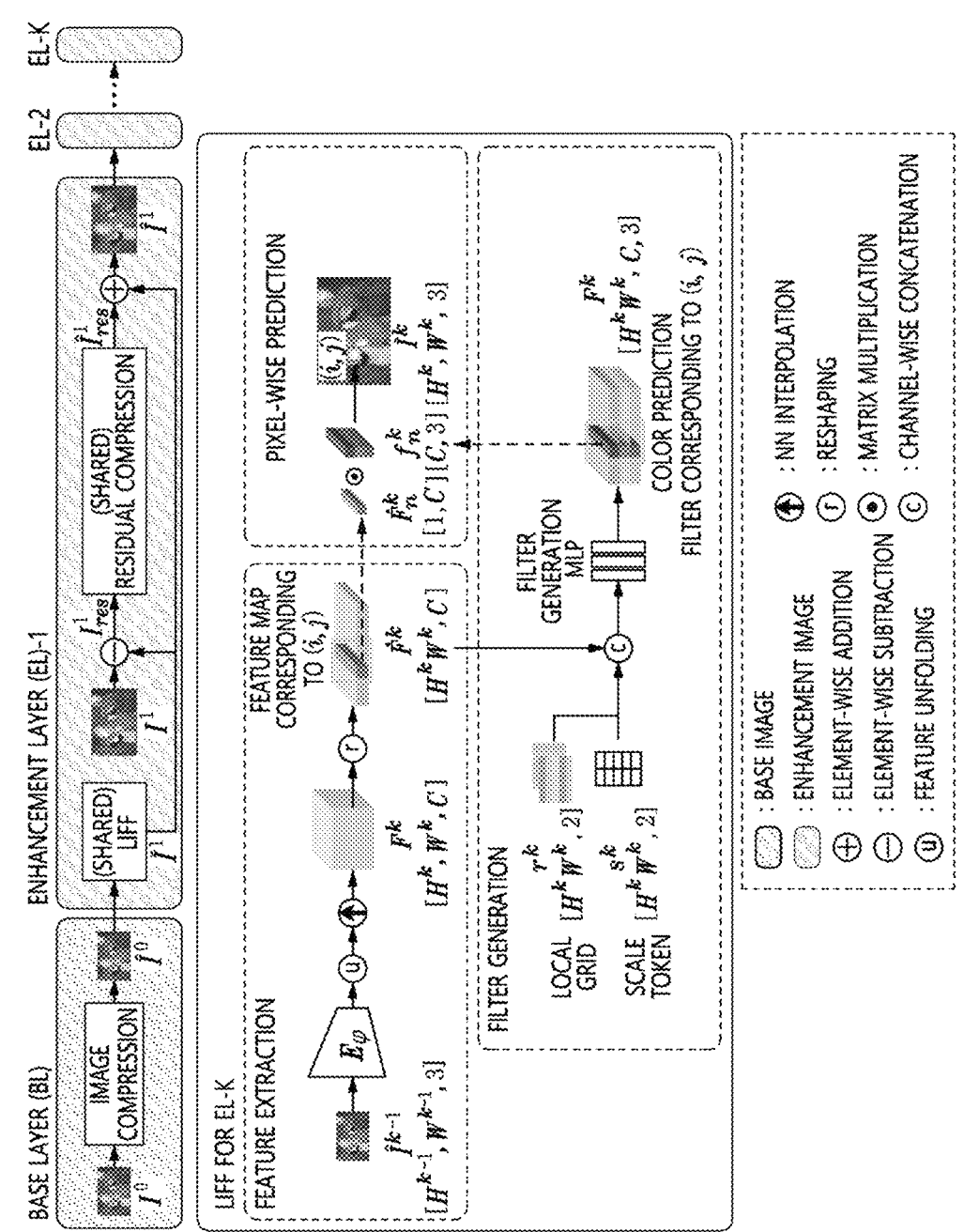
FIG. 4 illustrates the overall architecture of COMPASS according to an example.

FIG. 4 illustrates the overall architecture of COMPASS according to an example.

Referring to FIG. 4, COMPASS may include a BL shown on the upper left side and one or more ELs shown on the upper right side. The one or more ELs may be operated in an iterative manner. Shared modules (i.e., LIFF and residual compression) may be used for multiple ELs.

The operation of COMPASS having K+1 layers may be represented by the following Equation (1):

$$\hat{I}^k = \begin{cases} IC(I^k), & \text{if } k = 0(BL) \\ \bar{I}^k + \hat{I}^k_{res}, & \text{if } k > (EL-k) \end{cases} \quad (1)$$

Here, for k>0, the following Equations (2) and (3) may be established.

$$\check{I}^k = \psi\left(\hat{I}^{k-1}, s^k, r^k\right) \tag{2}$$

$$\hat{I}^k_{res} = RC\left(I^k_{res}\right) \tag{3}$$

As illustrated in FIG. 4, IC(·) may denote the image compression module of the BL.

Further, RC(·) may denote the residual compression module of EL-k.

Both for the image compression module and the residual compression module, a mean-scale architecture may be used.

$\check{I}^k$ defined by the following Equation (4) may denote arbitrarily upscaled prediction for the EL-k.

$$\check{I}^k \in \mathbb{R}^{H^k \times W^k \times 3} \tag{4}$$

The LIFF module may be indicated by $\psi(\cdot)$.

$\check{I}^k$ may be predicted from the smaller reconstruction $\hat{I}^{k-1}$ by the LIFF module $\psi(\cdot)$.

$I_{res}^k$ may denote a residual image between $I^k$ and $\check{I}^k$.

The LIFF module may take a local grid $r^k$ and a scale token $s^k$ as additional inputs.

The following Equation (5) may be applied to the local grid $r^k$.

$$r^k \in \mathbb{R}^{H^k W^k \times 2} \tag{5}$$

The following Equation (6) may be applied to the scale token $s^k$.

$$s^k \in \mathbb{R}^{H^k W^k \times 2} \tag{6}$$

The local grid $r^k$ and the scale token $s^k$ will be described in detail below.

In the encoder part, since the output of the convolution layer is progressively decreased by half due to the convolution of stride 2, the initial input of the encoder part may be padded with the size of a power of 2 in a lump.

This padding may actually deteriorate the coding efficiency of image compression that uses arbitrary scale factors.

Therefore, in embodiments, a convolutional-layer-wise padding scheme may be utilized. In the convolutional-layer-wise padding scheme, (i) when the width size or height size of input in each convolutional layer of the encoder part of the residual compression module is an odd number, Both the width size and the height size may be adjusted to an even size by performing padding with a padding size of 1, and (ii) a padded region may be cropped out for the output of the convolutional layer corresponding to a decoder part. At this time, the padding area of 1 in the encoder can be filled with values in various ways, such as replicate, edge, and constant.

LIFF: Inter-Layer Arbitrary Scale Prediction

In order to achieve high coding efficiency with COM-PASS, it may be essential to effectively reduce redundancy between adjacent layers.

For this reduction, an inter-layer arbitrary scale prediction method which exploits a Local Implicit Image Function (LIIF) and a Meta-SR-based Local Implicit Filter Function (LIFF) may be used.

First, the LIFF module may transform reconstruction $\hat{I}^{k-1}$ of a previous layer into a feature domain. Next, the LIFF module may increase the reconstruction resolution thereof to match the resolution of reconstruction, transformed into the feature domain, with arbitrarily upscaled prediction $\check{I}^k$ through simple interpolation.

Further, the LIFF module may generate a color prediction filter for each pixel coordinate. The LIFF module may estimate pixel-wise RGB colors by applying the generated filter to an extracted feature slice corresponding to target pixel coordinates.

The procedure of the LIFF module may be divided into three stages corresponding to 1) feature extraction, 2) filter generation, and 3) pixel-wise prediction, as shown in the lower portion of FIG. 4.

1) Feature Extraction

In feature extraction, feature information may be extracted from the reconstruction $\hat{I}^{k-1}$ of the previous layer through a Residual Dense Network (RDN)-like feature extractor $E_\psi$. Further, in order to generate the feature map $F^k$, feature unfolding and nearest-neighbor upsampling may be applied to the extracted feature information.

The following Equation (7) may be applied to the feature map $F^k$.

$$F^k \in \mathbb{R}^{H^k \times W^k \times C} \tag{7}$$

2) Filter Generation

In filter generation, a color prediction filter $f^k$ may be generated. The following Equation (8) may be applied to the color prediction filter $f^k$.

$$f^k \in \mathbb{R}^{H^k W^k \times C \times 3} \tag{8}$$

The color prediction filter $f^k$ may be generated, as shown in the following Equation (9) using a filter generation Multi-Layer Perceptron (MLP).

$$f^k = \phi\left(\left[\dot{F}^k, r^k, s^k\right]; \theta\right) \tag{9}$$

Here, $\dot{F}^k$ may be a flattened feature map.

The following Equation (10) may be applied to $\dot{F}^k$ $$\dot{F}^k \in \mathbb{R}^{H^k W^k \times C} \tag{10}$$

$\phi(\cdot)$ may denote a filter generation MLP having a parameter.

$\lceil \cdot \rfloor$ may denote channel-wise concatenation.

The local grid $r^k$ and the scale token $s^k$ may follow the same process as LIIF.

As described above, the above-described Equations (5) and (6) may be applied to the local grid $r^k$ and the scale token $s^k$.

The local grid $r^k$ may be normalized relative coordinates between the reconstruction $\hat{I}^{k-1}$ of the previous layer and the upscaled prediction $\breve{I}^k$. The local grid $r^k$ may be formulated, as shown in the following Equation (11):

$$r^k(i, j) = p^k(i, j) - p^{k-1}(i', j')  \qquad (11)$$

$p^k(i,j)$ may denote the normalized coordinates of the upscaled prediction $\breve{I}^k$ pixel coordinates (i,j).

$p^{k-1}(i', j')$ may indicate normalized coordinates corresponding to the reconstruction $\breve{I}^{k-1}$ of the previous layer at pixel coordinates (i', j').

In order to find pixel correspondence between the pixels, the nearest-neighbor may be used.

The normalized coordinates may be calculated, as shown in the following Equation (12):

$$p^l(i, j) = \left[-1 + (2i + 1)/H^l, -1 + (2j + 1)/W^l\right]  \qquad (12)$$

Here, the following Equation (13) may be applied to i.

$$i \in \left[0, H^l - 1\right]  \qquad (13)$$

Here, the following Equation (14) may be applied to j.

$$j \in \left[0, W^l - 1\right]  \qquad (14)$$

The scale token $s^k$ may denote a height/width ratio between $\hat{I}^{k-1}$ and $\breve{I}^k$.

Next, the scale token $s^k$ may contain all the same ratio values as that in the following Equation (15):

$$\left(2 \cdot H^{k-1}/H^k, 2 \cdot W^{k-1}/W^k\right)  \qquad (15)$$

3) Pixel-Wise Prediction

In pixel-wise prediction, in order to determine the RGB color of the arbitrarily upscaled prediction $\breve{I}^k$ at the pixel coordinates (i,j), the color prediction filter $f_n^k$ may be applied to the generated feature map $\dot{F}_n^k$ by simple matrix multiplication shown in the following Equation (16):

$$\breve{I}^k(i, j) = \dot{F}_n^k \odot f_n^k  \qquad (16)$$

n may denote a batch index number corresponding to the pixel coordinates (i,j) of prediction $\breve{I}^k$.

Here, the following Equation (17) may be applied to n.

$$n \in \left[0, H^k W^k - 1\right]  \qquad (17)$$

The following Equation (18) may be established for n.

$$n = i + j \cdot H^k  \qquad (18)$$

The LIFF module may perform pixel-wise prediction in parallel on all coordinates, as shown in the following Equation (19):

$$\breve{I}^k = \dot{F}^k R \odot f^k  \qquad (19)$$

Figure 5:
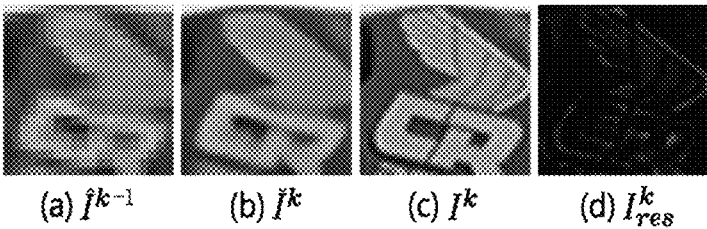
FIG. 5 illustrates images predicted by a LIFF module according to an example.

FIG. 5 illustrates images predicted by a LIFF module according to an example.

In FIG. 5, (a) reconstruction of a previous layer k-1, (b) the output of the LIFF module (predicted image), (c) the input image of the current layer k, and (d) a residual image as the input of a residual compression module are illustrated.

In FIG. 5, the following images are illustrated.
1) an image $\breve{I}^k$ predicted by the LIFF module
2) an associated residual image $I_{res}^k$ of $\breve{I}^k$. $I_{res}^k$ may be a residual image to be compressed for a given reconstructed image $\breve{I}^{k-1}$ of the previous layer k-1.
3) an uncompressed input image $I^k$ (ground truth) in the current layer k.

Compared to $\hat{I}^{k-1}$ in (a) of FIG. 5, $\breve{I}^k$ in (b) of FIG. 5 may show a result much closer to $I^k$ in (c) of FIG. 5. Therefore, $\breve{I}^k$ may lead to a smaller amount of residues $I_{res}^k$ in (d) of FIG. 5.

Optimization

The whole elements of COMPASS may be trained in an end-to-end manner having a frozen pre-trained image compression module for the BL.

In order to boost training, separately pre-trained LIFF and residual compression modules may be used.

In order to train the architecture of COMPASS, a combined RD loss function may be used for one or more enhancement layers, as shown in the following Equation (20):

$$L = \sum_{k=1}^{K} R^k + \lambda \cdot D^k  \qquad (20)$$

Here, $R^k$ may denote a rate term for EL-k. $D^k$ may denote a distortion term for EL-k.

As in the case of other NN-based image compression methods, rate and distortion may be jointly optimized, but, in embodiments, the summation of rates and distortions for K ELs may be used.

In order to maintain R-D balance over the whole layers, the same $\lambda$ value may be used for K ELs.

In detail, the rate term $R^k$ may be an estimated rate amount for the EL-k, that is, the summation of cross-entropy values for latent representations $y^k$ and $z^k$.

$y^k$ may be a latent representation transformed from the input residual image $I_{res}^k$ over the encoder network of the residual compression module.

$z^k$ may be a latent representation transformed from the representation $y^k$ over the hyper-encoder network of the residual compression module, as in the case of hyperprior-based models.

The rate term $R^k$ may be represented by the following Equation (21):

$$R^k = H^k\left(\hat{y}^k \mid \hat{z}^k\right) + H^k(\hat{z}^k)  \qquad (21)$$

15 16

Here, $H^k(\tilde{y}^k|\tilde{z}^k)$ and $H^k(\tilde{z}^k)$ may denote cross-entropy terms for noisy latent representations $\tilde{y}^k$ and $\tilde{z}^k$ for the EL-k.

The cross-entropy values may be calculated based on a Gaussian entropy model used in a mean-scale model.

As in the case of the NN-based image compression methods, the noisy latent representations $\tilde{y}^k$ and $\tilde{z}^k$ for the EL-k may be sampled using additive uniform noise so as to fit the samples to the approximate Probability Mass Function (PMF) $P(\cdot)$ of discretized representations of $y^k$ and $z^k$ for the EL-k.

$D^k$ may be a Mean Squared Error (MSE) between the reconstructed image $\hat{I}^k$ and the input image $I^k$ for the EL-k.

$\hat{I}^k$ may be represented by the following Equation (22):

$$\hat{I}^k = \bar{I}^k + \hat{I}^k_{res} \tag{22}$$

Here, the following Equations (23) and (24) may be established for $\hat{I}_{res}{}^k$ and $\hat{y}^k$, respectively.

$$\hat{I}^k_{res} = D^{RC}(\hat{y}^k) \tag{23}$$

$$\hat{y}^k = Q\big(E^{RC}(I^k_{res})\big) \tag{24}$$

$E^{RC}(\cdot)$ and $D^{RC}(\cdot)$ may denote the encoder network and the decoder network of the residual compression module RC($\cdot$), respectively.

$Q(\cdot)$ may be a rounding function.

A rounded latent representation $\hat{y}^k$ instead of the noisy representation $\bar{y}^k$ may be used to calculate the distortion term.

When the input of the decoder network $D^{RC}$ becomes the noisy representation $\bar{y}^k$, poor optimization results may be obtained. In contrast, when the rounded expression $\hat{y}^k$ instead of $\bar{y}^k$ is input, coding efficiency may be further improved.

Suboptimal performance of COMPASS using noisy representations may result from the propagation of small errors in reconstructions, attributable to additive uniform noise, to the following EL.

Due to the propagation of those errors, serious discrepancy between training and inference may be caused as a result, thus ultimately severely hindering coding efficiency.

Hierarchical and recursive operations of COMPASS may affect this issue.

In contrast, because the use of the rounded representations does not cause discrepancy between training phases and inference phases, the above-described error propagation may be certainly prevented.

In order to handle discontinuity attributable to rounding operations, gradients may be bypassed backward.

In contrast with distortion terms, COMPASS may still use noisy representation $\bar{y}^k$ so as to calculate the rate term $R^k$ so that samples are fitted to the approximate PMF $P(\cdot)$.

Figure 6:
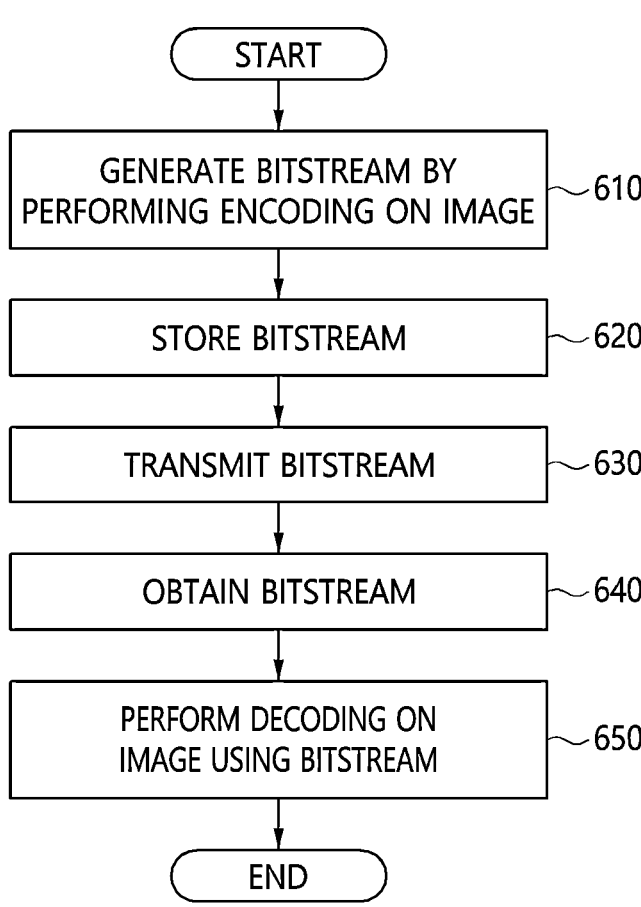
FIG. 6 is a flowchart of a coding method according to an embodiment.

FIG. 6 is a flowchart of a coding method according to an embodiment.

At step 610, the processing unit 110 of the encoding apparatus 100 may generate a bitstream by performing encoding on an image.

The bitstream may include information about multiple scaled versions of the image. The processing unit 110 of the encoding apparatus 100 may generate the bitstream including the information about multiple scaled versions of the image by performing encoding on the image.

Encoding on the image may include processing on the image, described in the embodiments.

At step 620, the processing unit 110 of the encoding apparatus 100 may store the bitstream in a storage unit.

At step 630, the communication unit 120 of the encoding apparatus 100 may transmit the bitstream to the communication unit 220 of the decoding apparatus 200.

The communication unit 220 of the decoding apparatus 200 may receive the bitstream from the communication unit 120 of the encoding apparatus 100.

At step 640, the processing unit 210 or the storage unit of the decoding apparatus 200 may obtain the bitstream.

At step 650, the processing unit 210 of the decoding apparatus 200 may perform decoding on the image using the bitstream.

Decoding on the image may include processing on the image, described in embodiments.

The bitstream may include information about multiple scaled versions of the image. The processing unit 210 of the decoding apparatus 200 may perform decoding on the image using information included in the bitstream, that is, the information about multiple scaled versions of the image.

Through decoding, the image may be reconstructed.

Encoding on the image, described in embodiments, may also be applied to decoding on the image.

For example, a specific target, described in encoding on the image, may also perform the same function in decoding on the image. Alternatively, when the specific target performs a specific function in encoding on the image, the specific target may perform an inverse function of the specific function in decoding on the image.

For example, decoding on the image may include inverse processing of processing on the image, described in embodiments. For example, in embodiments, the input of the specific target in encoding may be regarded as the output of the specific target in decoding. The output of the specific target in encoding may be regarded as the input of the specific target in decoding. Specific processing by the specific target in encoding may be regarded as inverse processing of the specific processing by the specific target in decoding.

For example, the specific target may be the specific module, described in embodiments with reference to FIGS. 3 and 4.

For example, the version of the image in the bitstream may be encoded with a layer corresponding to the version.

The above-described embodiments may be performed using the same method and/or corresponding methods in the encoding apparatus 100 and the decoding apparatus 200. Further, in image encoding and/or decoding, a combination of one or more of the foregoing embodiments may be used.

The order of application of the embodiments may differ in the encoding apparatus 100 and the decoding apparatus 200. Alternatively, the order of application of the embodiments may be (at least partially) the same in the encoding apparatus 100 and the decoding apparatus 200.

The embodiments may be performed on each of a luma signal and a chroma signal. The above-described embodiments may be equally performed on the luma signal and the chroma signal.

In the above-described embodiments, it may be construed that, when specific processing is applied to a specific target, specified conditions may be required, and that, when description is made such that the specific processing is performed under specified determination, whether the specified conditions are satisfied may be determined based on a specified coding parameter, or alternatively, when description is made such that specific determination is made based on a specific coding parameter, the specific coding parameter may be replaced with an additional coding parameter. In other words, it may be considered that a coding parameter that influences the specific condition or the specific determination is merely exemplary, and it may be understood that, in addition to the specified coding parameter, a combination of one or more coding parameters functions as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented in the form of program instructions that can be executed by various computer elements and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The bitstream may include computer-executable code and/or program. The computer-executable code and/or program may include pieces of information described in embodiments, and may include syntax elements described in the embodiments. In other words, pieces of information and syntax elements described in embodiments may be regarded as computer-executable code in a bitstream, and may be regarded as at least part of computer-executable code and/or program represented by a bitstream.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided an apparatus, a method and a storage medium for images, which support arbitrary-scale spatial scalability.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

What is claimed is:

1. An image coding method, comprising:
generating a bitstream including information about multiple scaled versions of an image; and
storing the bitstream, wherein
the bitstream is generated by a neural network-based image compression network that supports arbitrary-scale spatial scalability, and
the neural network-based image compression network uses an inter-layer arbitrary scale prediction method based on implicit neural representations.

2. The image coding method of claim 1, wherein each version of the image in the bitstream is encoded with a layer corresponding to the version.

3. The image coding method of claim 1, wherein, in the neural network-based image compression network, a number of multiple layers and respective scale factors of the multiple layers are arbitrarily determined during inference.

4. The image coding method of claim 3, wherein the scale factors include values other than 2.

5. The image coding method of claim 3, wherein the multiple layers comprise a base layer and one or more enhancement layers.

6. The image coding method of claim 5, wherein, in the base layer, an input image having a smallest size is input to an image compression module, and a reconstructed image is generated using the input image.

7. The image coding method of claim 5, wherein a single shared prediction module is used for the one or more enhancement layers.

8. The image coding method of claim 7, wherein a combined rate-distortion loss function is used for the one or more enhancement layers.

9. An image coding method, comprising:
generating a bitstream including information about multiple scaled versions of an image; and
storing the bitstream, wherein
the bitstream is generated by a neural network-based image compression network that supports arbitrary scale spatial scalability, wherein
in the neural network-based image compression network, a number of multiple layers and respective scale factors of the multiple layers are arbitrarily determined during inference,
the multiple layers comprise a base layer and one or more enhancement layers,
a shared sub-network is used for each of the one or more enhancement layers, and the shared sub-network comprises an inter-layer arbitrary scale prediction module and a residual compression module.

10. A non-transitory computer-readable storage medium for storing the bitstream generated by the image coding method of claim 1.

11. An image coding method, comprising:

obtaining a bitstream; and performing decoding on an image using information about multiple scaled versions of the image in the bitstream, wherein the bitstream is processed by a neural network-based image compression network that supports arbitrary-scale spatial scalability, and the neural network-based image compression network uses an inter-layer arbitrary scale prediction method based on implicit neural representation.

12. The image coding method of claim 11, wherein each version of the image in the bitstream is encoded with a layer corresponding to the version.

13. The image coding method of claim 11, wherein, in the neural network-based image compression network, a number of multiple layers and respective scale factors of the multiple layers are arbitrarily determined during inference.

14. The image coding method of claim 13, wherein the scale factors include values other than 2.

15. The image coding method of claim 13, wherein the multiple layers comprise a base layer and one or more enhancement layers.

16. The image coding method of claim 15, wherein a single shared prediction module is used for the one or more enhancement layers.

\* \* \* \* \*